United States Patent [19]

Saarijärvi

[11] Patent Number: 5,254,051
[45] Date of Patent: Oct. 19, 1993

[54] GEARSHIFT

[75] Inventor: Erkki Saarijärvi, Rovaniemi, Finland

[73] Assignee: Matti Mäkilä, Loimaa, Finland; a part interest

[21] Appl. No.: 858,987

[22] PCT Filed: Dec. 13, 1990

[86] PCT No.: PCT/FI90/00295
§ 371 Date: Jul. 1, 1992
§ 102(e) Date: Jul. 1, 1992

[87] PCT Pub. No.: WO91/09239
PCT Pub. Date: Jun. 27, 1991

[30] Foreign Application Priority Data

Dec. 14, 1989 [FI] Finland ............... 895972

[51] Int. Cl.⁵ ............... F16H 47/08; F16H 3/72
[52] U.S. Cl. ............... 475/47; 475/36; 475/53; 475/58
[58] Field of Search ............... 475/35, 36, 43, 47, 475/51, 52, 53, 58, 59, 71, 201, 204, 205

[56] References Cited

U.S. PATENT DOCUMENTS

| 2,147,528 | 2/1939 | Fottinger | 475/36 X |
| 2,176,138 | 10/1939 | Kelley | 74/189.5 |
| 2,682,786 | 7/1954 | Flinn | 475/36 |
| 2,973,668 | 3/1961 | Rumker | 475/58 X |
| 3,924,489 | 12/1975 | Yasuda | 475/53 |
| 4,120,213 | 10/1978 | Levy | 475/53 |
| 4,579,019 | 4/1986 | Gabriele | 475/47 |
| 4,916,973 | 4/1990 | Fuelberth et al. | 475/53 |
| 4,928,552 | 5/1990 | Gabriele | 475/47 X |

FOREIGN PATENT DOCUMENTS 0037059 10/1981 European Pat. Off. .

OTHER PUBLICATIONS

Design News, Jul. 21, 1958, vol. 13, No. 15, p. 30.

Primary Examiner—Leslie A. Braun
Assistant Examiner—Khoi Q. Ta
Attorney, Agent, or Firm—Morgan & Finnegan

[57] ABSTRACT

A continuously variable hydro-mechanical transmission wherein a power source input is split into three inputs. A torque provided by a power source proceeds to a bevel gear of a center boss. The torsional force of the lowest mechanical gear ratio is passed by means of an overrunning clutch to a planetary gear, the ratio being selected according to a required application. The torque of an intermediary gear translates hydrodynamically through the action of a fluid clutch to a collecting planetary gear at a given appropriate ratio. The torque of a direct gear translates mechanically through the action of a box drum directly to a torque output shaft. All three gear ratios participate in the transmission of torque simultaneously—either actively or passively.

1 Claim, 1 Drawing Sheet

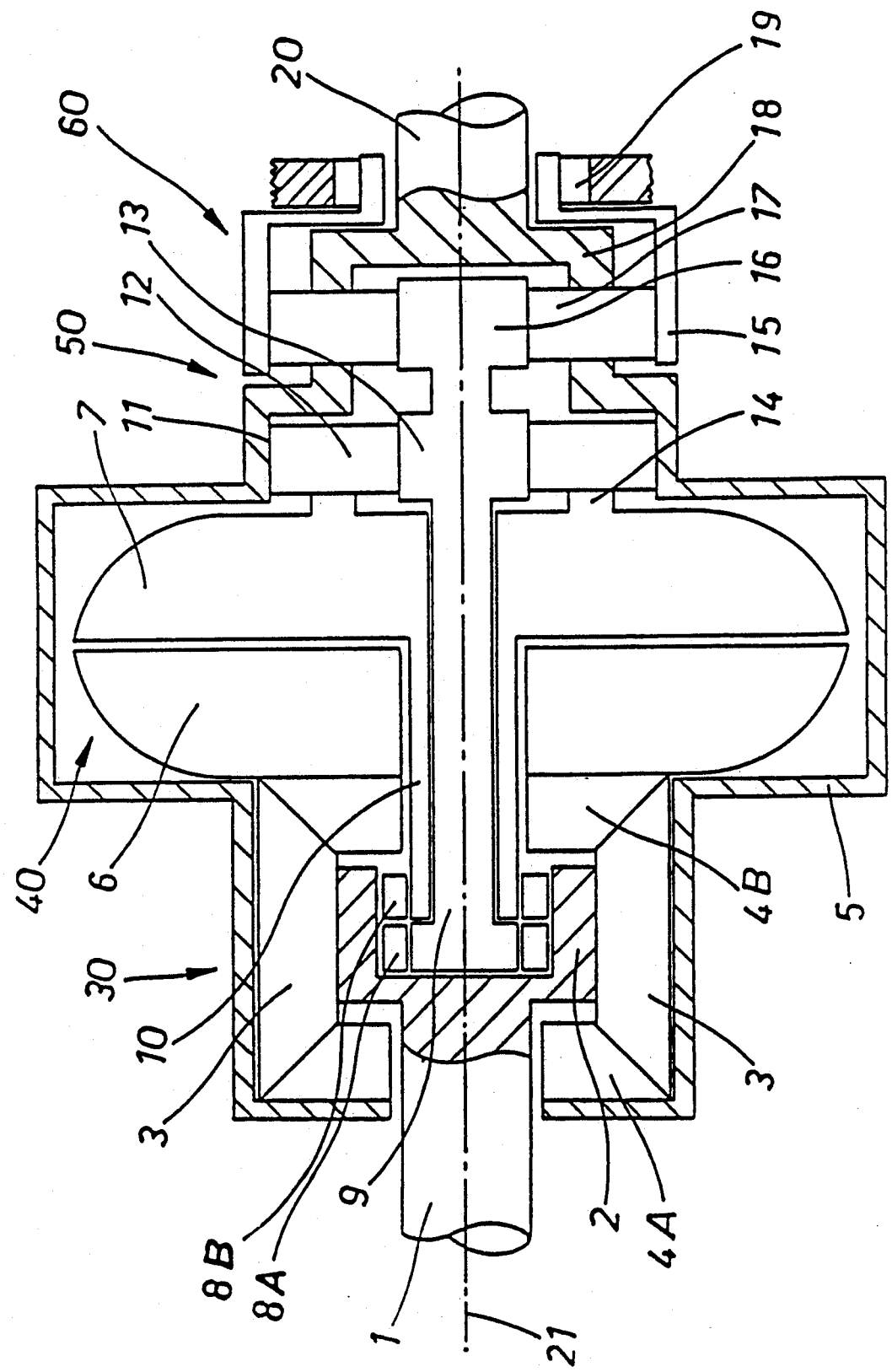

1

GEARSHIFT

The present invention relates a gearshift for transmitting a continuous drive by way of three gear ratios, wherein the power extracted from a motor at any given time is controlled automatically through different gear ratios according to a required application, said gearshift comprising an input shaft and an output shaft having a common centre axis, and a box drum rotatably journalled relative to said centre axis, a power supply gear, a fluid clutch or a means having similar qualities, a first planetary gear, a second planetary gear, as well as a gearshift main shaft whose rotating axis coincides with said centre axis, said input shaft being adapted to transmit a Dower-source activated rotating motion on the one hand to gearshift main shaft and on the other hand, by means of power supply gear, to box drum and to a pump wheel included in fluid clutch.

An object of the invention is to provide a gearshift as described above and particularly a gearshift which requires no sensors, governors or locking keys. This object is achieved according to the invention and the invention is characterized in that power transmission from gearshift input shaft to main shaft is arranged through the intermediary of an overrunning clutch or the like in a manner that said main shaft has a speed of rotation which is at least equal to that of input shaft, that both a sun wheel included in first planetary gear and a sun wheel included in second planetary gear are coupled to main shaft, that a planetary support included in first planetary gear is coupled to a turbine disc included in fluid clutch and a peripheral disc to box drum, that turbine disc of fluid clutch is coupled with gearshift input shaft through the intermediary of an overrunning clutch or the like in a manner that the speed of rotation of turbine disc is limited not to exceed that of input shaft, that a planetary support included in second planetary gear is coupled to drum box and a peripheral disc is journalled to be rotatable relative to centre axis and in such a way fixedly through the intermediary of an overrunning clutch or the like mounted on a stationary body portion that the rotation of peripheral disc is prevented in the direction opposite to the rotating direction of box drum.

A torque supplied by the power source is delivered to a bevel gear type or cylindrical gearwheel type or some other type of appropriate centre boss or to a component otherwise suitable for the distribution of torque. The torsional force of the lowest, mechanical gear ratio is delivered by means of an overrunning clutch or some other device operating on a similar principle to a planetary gear or a transmission unit operating on some other similar principle, the gear ratio being selected according to a required application. The torque of a so-called intermediary gear passes hydrodynamically through the action of a fluid clutch over to a collecting planetary gear at a gear ratio suitable for a given application. The torque of a so-called direct gear passes mechanically through the action of a box drum over to a shaft directly delivering the torque. All three gear ratios participate in the transmission of torque simultaneously - either actively or passively. This way the power extracted from a power source can be transmitted at an optimal gear ratio to a particular service.

The invention will now be described in more detail by way of an example with reference made to the accompanying drawing, in which FIG. 1 shows a schematic cross-section of a gearshift of the invention.

The main components of a gearshift shown schematically in FIG. 1 include a gearshift input shaft 1 connected through the intermediary of a clutch to a power source, a power supply gear 30, a fluid clutch 40, a first planetary gear 50, a second planetary gear 60, a gearshift main shaft 9, and a gearshift box drum 5 which is fixedly connected (by way of a planetary support 18 included in planetary gear 60) with a gearshift output shaft 20.

The shafts 1, 9 and 20 have a common centre axis 21, the gearshift components being journalled in a per se known fashion to be rotatable relative to said axis.

The end of input shaft 1 adjacent to the gearshift provides a centre boss 2 for the power supply gear. In the solution shown in FIG. 1 the power supply gear is of a bevel gear type and generally includes an even number, usually 2, 4 or 6 of small bevel wheels 3 journalled perpendicularly for free rotation relative to shaft 1. The large bevel wheels included in the power supply gear are indicated with reference numerals 4A and 4B and their axis of rotation coincides with gearshift centre axis 21. Bevel wheel 4A is fixedly coupled to box drum 5. Bevel wheel 4B is in turn fixedly coupled to a pump wheel 6 included in fluid clutch 40.

The centre boss 2 of input shaft 1 is provided with an overrunning clutch or the like indicated with reference numeral 8A. The achievement of overrunning clutch 8A is that the main shaft 9 serving as an extension of shaft 1 always rotates at a speed which is at least equal to that of shaft 1.

Shaft 9 is fixedly provided with a sun wheel 13 included in planetary gear 50 as well as with a sun wheel 16 included in planetary gear 60.

The number of planetary wheels included in planetary gear 50 is usually at least 3 and those are indicated with reference numeral 13, a peripheral disc is shown at 11 and a planetary support at 14. A peripheral disc 11 is fixedly connected to drum box 5 which is journalled rotatably relative to centre axis 111. On the other hand, a planetary support 14 is fixedly connected to a turbine disc 7 included in fluid clutch 40.

The pump wheel 6 and turbine disc 7 of fluid clutch 40 are journalled rotatably relative to gearshift centre axis 21. Turbine disc 7 is fixedly provided—concentrically with the axis of rotation 21 of turbine disc 7—with a tunnel shaft 10 which at its free end is in turn connected to centre boss 2 mounted on the end of input shaft 1 through the intermediary of an overrunning clutch or the like indicated with reference numeral 8B in a manner that the speed of tunnel shaft 10, and thus also that of turbine disc 7, cannot be faster than the rotating speed of shaft 1.

The planetary gear 60 has its sun wheel 16 fixedly carried on shaft 9, as indicated above, and includes planetary wheel shown at reference numeral 17, a peripheral disc shown at 15 and a planetary support shown at 18.

Planetary wheels 17, the number of which is usually at least three, are rotatably journalled to planetary support 18 which in turn provides a fixed component together with drum box 5. Peripheral disc 15 is journalled rotatably relative to gearshift centre axis 21 and relative to a stationary body portion through the intermediary of an overrunning clutch or the like indicated with reference numeral 19 in a manner that peripheral disc 15 can only rotate in the same direction as input shaft 1 driven by the power source.

A gearshift according to the invention includes three gear ratios which transmit a continuous drive forward as well as a separately switchable reverse gear. All three automatically controlled gear ratios participate in the transmission of torque simultaneously either actively or passively. The power transmission routes paths I, II and III - at various gear ratios are discussed later in connection with the description of the gearshift operating principle.

Prior to studying more closely the operation of a gearshift, a brief reference is made to the prior known characteristics of fluid clutch 40 which are important in view of the operation of a gearshift according to the invention:
1. At low speeds of rotation of pump wheel the torque transmission ability is low.
2. As the difference in speeds of rotation between pump wheel and turbine disc increases, the torque-transmission ability increases and, inversely, as the difference in speeds decreases, the torque-transmission ability decreases.
3. A high speed of rotation for pump wheel means a high torque-transmission ability regardless of the speed of rotation of turbine disc.
4. Slipping of fluid clutch.

At an initial situation with all gearshift components completely stationary in position and the rotating motion of a power source is coupled through the intermediary of a clutch (not shown) on gearshift input shaft 1, the rotating motion, which proceeds in the same direction as that of a power source, translates to the centre boss 2 of power supply gear 30.

The rotating motion received in centre boss 2 translates through the intermediary of overrunning clutch 8A to shaft 9. The sun wheel 16 of planetary gear 60 sets the planetary wheels 17 and peripheral disc 15 of planetary gear 60 in a rotating motion which is opposite to that of the power source. However, this motion of peripheral disc 15 is prevented by overrunning clutch 19. Thus, the overrunning clutch 19 forces planetary support 18 to rotate in the same direction as the power source. The box drum 5 and gearshift output shaft 20 coupled together with planetary support 18 are thus rotating as a suitably selected lowest gear ratio (path I). The peripheral disc 15 is left passive, in other words it remains stationary but provides a support moment at this gear ratio.

The power transmission of path I is completely mechanical. The purpose of overrunning clutch 8A is to always translate at least the same speed of rotation from shaft 1 to shaft 9.

At the same time as path I has initiated its action, also path II and path III are activated.

The coupling of path III is mechanical and its gear ratio is direct (1:1).

The gear ratio of planetary support 14 is suitably selected between path I and path III. The power transmission of path II proceeds through a fluid clutch and, thus, hydrodynamically.

Prior to discussing as to how the power transmission is effected for path II, the following can be noted about the components included in path II.

The small bevel wheels 3 coupled to the centre boss cf power supply gear 30 rest against large bevel wheels 4 with the one shown at 4A being coupled to box drum 5 and, thus, this large bevel wheel 4A always rotates at the same speed as gearshift output shaft 20. The large bevel wheel 4B is coupled to pump wheel 6 of fluid clutch 40. The turbine disc 7 of fluid clutch 40 is coupled to planetary support 14 included in planetary gear 50. In addition, the turbine disc is in communication with centre boss 2 of power supply gear 30 by way of tunnel shaft 10 and overrunning clutch 8B. The purpose of this overrunning clutch is to prevent shaft 10 and thus turbine disc 7 from rotating faster than shaft 1.

The small bevel wheels 3, which take up a support moment from large bevel wheel 4A, drive a pump wheel 6 included in fluid clutch 40. As the difference in speed between pump wheel 6 and turbine disc 7 increases, the torque-transmission ability of fluid clutch 40 increases, as pointed out above. When said difference in speed is sufficient, the speed of turbine disc 7 and planetary support 14 carried thereby begins to pick up, whereby planetary wheels 12 lake up a support moment from a peripheral disc 11. The result of this is, in turn, that the speed of shaft 9 increases to exceed that of shaft 1 which is possible by means of an overrunning clutch 8A.

In this connection, it should be emphasized that the power supply gear is characterized by a power division ratio of 50/50 and that the speed of rotation of pump wheel 6 is obtained by multiplying the speed of rotation of shaft 1 by two and by subtracting from the product the speed of rotation of large bevel wheel 4A.

All the way until overrunning clutch 8B limits the speed of rotation of turbine disc 7, the power is transmitted by means of the support moment of peripheral disc 11 through sun wheels 13 and 16 to planetary wheels 17. Planetary wheels 17 provide a peripheral disc 15 with an opposite moment of rotation which is overcome by means of overrunning clutch 19 and the power is transmitted through planetary support 18 to output shaft 20.

When path II has reached the speed of rotation of a power source, the increase of its speed of rotation is prevented by means of overrunning clutch 8B. Thus, the passage of power through planetary support 14, i.e. path II, ceases completely. The speed of rotation of pump wheel 6 included in the fluid clutch remains higher than that of turbine disc 7, i.e. the Dump wheel still has some torque-transfer ability left. As the speed of rotation of a power source is maintained constant, also the speed of rotation of planetary support 14, tunnel shaft 10 and turbine disc 7 remains constant. Preventing the increase of the speed of rotation o-f these components results in the formation of a counter-torque on turbine disc 7 included in the fluid clutch and this is reflected to pump wheel 6 included in the fluid clutch. A bevel wheel 4B fastened to pump wheel 6 rests through the intermediary of small bevel wheels 3 against bevel wheel 4A from which the path II receives a support moment.

Now that the power transmission passing through path II is prevented, path III further receives a counter-torque provided by path II, this additional torque resulting in a more effective passage of power through box drum 5 to output shaft 20. The speed of rotation of the latter begins to rise and the same applies to bevel wheel 4A, peripheral disc 11 and planetary support 18 coupled therewith. When the speeds of rotation of planetary support 14 remain constant, the sun wheel 13 will be relieved of a moment of rotation which is transmitted by planetary wheels 12 through path II and which is parallel. to the power source. Since the speed of rotation of peripheral disc 11 increases gradually in relation to planetary support 14, the speed of rotation of sun wheel 13 begins to slow down. As sun wheel 16 is in fixed contact with sun wheel 13, the speed of rotation of the former begins to slow down as well. Since, at the same time, the speed of rotation of planetary support 18 begins to increase, the peripheral disc 15 is forced to begin rotation in the same direction as output shaft 20. This can be achieved by means of overrunning clutch 19.

When the speed of rotation of box drum 5 and the components carried thereby begins to rise, the increase of the speed of rotation of bevel wheel 4A results in a decrease in the speed of rotation of bevel wheel 4B whenever the speed of rotation of a power source remains constant. This in turn leads to a decrease in the difference between the speeds of rotation of pump wheel 6 and turbine disc 7 included in the fluid clutch.

When the speed of rotation of pump wheel 6 is reduced to be equal to that of the turbine disc (i.e. equal to that of, the power source), shaft 9 and the components carried thereby have decelerated to the speed of rotation of the power source. Peripheral disc 15 has reached the same speed of rotation. At this stage, the output shaft 20 of a power transmission mechanism has the same speed of rotation as the power source. The gear ratio is 1:1. Thus, the gearshift components are only rotating relative to axis 21 at the same relative speed of rotation.

The gearshift operation is next discussed in a situation, wherein the gear ratio is direct, the speed of rotation a power source is constant and the speed of rotation of output shaft 20 should be quickly increased. An increase in the speed of rotation of a power source leads to an increase in the speed of rotation of the centre boss 2 of power supply gear 30. At this time, said centre boss 2 rotates faster than shaft 10 by virtue of overrunning clutch 8B. The braking effect of overrunning clutch 8B is over.

The overrunning clutch 8A picks up shaft 9 to the same speed of rotation as shaft 1. This produces an opposite rotating force for planetary wheels 17, whereby the speed of rotation of peripheral disc 15 slows down and finally comes to a halt, since it is retained by overrunning clutch 19 and cannot rotate in a direction opposite to that of the power source. At the same time, the increased speed of rotation of a power source is transmitted through the intermediary of small bevel wheels 3 included in power supply gear 30 to large bevel wheels 4A and 4B. The large bevel wheel 4A always rotates at the same speed of rotation as output shaft 20. An increase in the speed of notation of a power source is possible because of the slipping ability of a fluid clutch. Since the large bevel wheel 4A cannot, immediately follow the rise in the speed of rotation of a power source, the increased rotations are transmitted through the intermediary of small bevel wheels 3 and by means of the support moment of large bevel wheel 4A to a large bevel wheel 4B which is coupled to pump wheel 6 included in the fluid clutch. The increasing rotations and power transmit hydrodynamically by way of the lower gear of path II to output shaft 20. When the turbine disc 7 of fluid clutch 40 has again reached the speed of rotation of a power source, the braking effect of overrunning clutch 8B is re-established and the gear ratio becomes direct again.

The invention is only described above with reference made to just one preferred embodiment thereof. It is appreciated, however, that the invention can he modified in many ways within the scope of the annexed claims. Thus, for example, shaft 1 can be extended all the way to planetary gears 50, 60 and overrunning clutch SA can be fitted between shaft 1 and matched sun wheels 13, 16 and overrunning clutch 8B between shaft 1 and the turbine disc 7 of fluid clutch 40. Thus, the main shaft 9 can be provided by the sun wheels themselves or by a separate sleeve member to which said sun wheels 13, 16 are fastened. Said fluid clutch 40 can also be replaced by a means having similar qualities, e.g. an electromagnetic clutch. As an alternative, it is also possible to use e.g. electronic clutches as overrunning clutches 8A, 8B and 19.

I claim:

1. A continuously variable hydro-mechanical transmission, comprising a power source:

an input shaft, fixedly connected to said power source, and an output shaft having a common centre axis, and a box drum rotatably journalled relative to said centre axis;

a differential;

a fluid clutch;

a first planetary gear, having a plurality of planetary wheels;

a secondary planetary gear having a plurality of planetary wheels;

a gearshift main shaft whose rotating axis coincides with said centre axis, said input shaft being operatively adapted to transmit a power-source activated rotating motion to said gearshift main shaft and, by said differential, to box drum and to a pump wheel included in the fluid clutch, characterized in that power transmission from said input shaft to said main shaft is arranged through a first overrunning clutch such that said main shaft has a speed of rotation which is at least equal to that of said input shaft; both a sun wheel included in said first planetary gear and a sun wheel included in said second planetary gear are coupled to said main shaft; a first planetary support included in said first planetary gear is coupled to a turbine disc included in the fluid clutch and a first annular gear for imparting a rotation a moment to said planetary wheels of said first planetary gear is fixedly connected to said box drum; said turbine disc of said fluid clutch is also coupled with said input shaft through a second overrunning clutch such that the speed of rotation of said turbine disc is limited not to exceed that of said input shaft; a second planetary support included in said second planetary gear is coupled to the drum box; a second annular gear peripheral disc which is capable of being set in rotatable motion by said planetary wheels of said second planetary gear is journalled to be rotatable relative to said centre axis and in such a way fixedly through a third overrunning clutch mounted on a stationary body portion such that the rotation of said second annular gear is prevented in the direction opposite to a rotating direction of said box drum.

* * * * *